(No Model.)
R. LOFTHOUSE.
MEANS FOR HUMIDIFYING, DRYING, WARMING, OR COOLING AIR.
No. 424,118. Patented Mar. 25, 1890.
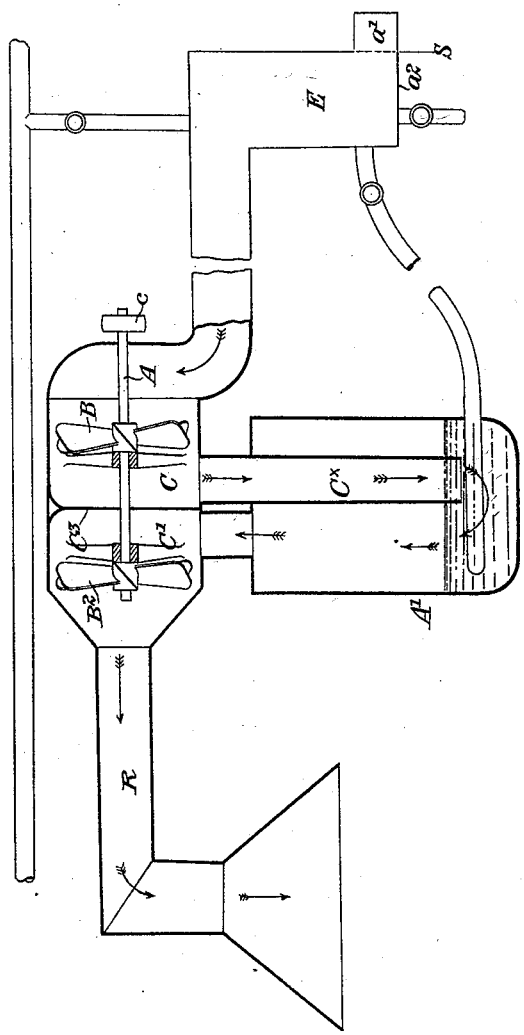
Witnesses
John Revell
S. C. Connor
Inventor.
Robert Lofthouse
By his Attorneys
Howson & Howson

UNITED STATES PATENT OFFICE.

ROBERT LOFTHOUSE, OF MANCHESTER, COUNTY OF LANCASTER, ENGLAND.

MEANS FOR HUMIDIFYING, DRYING, WARMING, OR COOLING AIR.

SPECIFICATION forming part of Letters Patent No. 424,118, dated March 25, 1890.

Application filed December 4, 1888. Serial No. 292,598. (No model.) Patented in England May 18, 1888, No. 7,361.

*To all whom it may concern:*

Be it known that I, ROBERT LOFTHOUSE, engineer, a subject of the Queen of Great Britain, and residing at 15 Wright Street, Greenheys, Manchester, in the county of Lancaster, England, have invented certain Improvements in Apparatus or Means for Humidifying, Drying, Warming, or Cooling and Distributing Air for Ventilating and other Purposes, (for which I have obtained a patent in Great Britain, No. 7,361, dated 18th of May, 1888,) of which the following is a specification.

The object of my invention is to provide simple and efficient means or apparatus for humidifying, drying, warming, or cooling air for ventilating purposes.

The accompanying drawing represents a longitudinal section of an apparatus according to my invention.

In this apparatus is a tank E, for heating or cooling air, and a water-trough A'. A steam-pipe provided with stop-cocks passes through the trough to evaporate the water when moist air is required. In the drawing this heater is shown provided with two openings $a'$ and $a^2$, one to lead the air from the apartment, the other to lead air from outside into the heater. A double-acting valve S is arranged to turn on its center, so as to close either opening while the other is open. The tank or heater E is connected with the water-trough A' by a passage C, which extends at $C^\times$ down into the trough. A passage C R leads from the upper part of the trough to the place to be warmed or ventilated. A wall $C^3$ divides the passage C from the passage C'. A shaft A driven by the pulley $c$ is provided with fans, one or more in the passage to the trough and one or more in the passage leading from the trough. Air enters the tank E, where it is either warmed or cooled. It is then drawn along the passage C by means of a fan B and forced down into the water in the trough, where it is purified and moistened. The fan $B^2$ then draws it from the trough and forces it through the passage R into the place to be ventilated.

A modified form of apparatus constructed according to this invention is shown in an application filed by me, Serial No. 313,211, for an improved heating apparatus.

I claim as my invention—

1. A ventilating apparatus consisting of a heater, a water-tank, a steam-pipe entering the tank for producing humidity, a passage connecting the heater with and extending down inside the water-tank, so as to force hot air into the water in the tank, a passage leading from the tank to the place to be humidified, and a fan in the passage between the heater and the water-tank for exhausting or drawing hot air from the heater and forcing it into the water-tank, all substantially as described.

2. The combination of a heating apparatus comprising a water-tank, a steam-pipe within the said tank, a passage connecting the heater with the water-tank, said passage extending down into the tank below the water-line, with a passage leading from the tank to the place to be ventilated, and two fans mounted upon the same shaft, one within the passage between the heater and the tank to force the heated air into the water in the tank, the other fan within the passage leading from the tank to force the heated and humidified air into the compartment, substantially as described.

In testimony whereof I have signed my name to this specification in the presence of two subscribing witnesses.

ROBERT LOFTHOUSE.

Witnesses:
 WILLIAM F. UPTON,
  *47 Lincoln's Inn Fields.*
 WM. JOHN WICKS,
  *9 Birchin Lane, London, E. C.*